(12) United States Patent
Blomqvist

(10) Patent No.: US 7,682,861 B2
(45) Date of Patent: Mar. 23, 2010

(54) METHOD FOR MANUFACTURING A MICROMECHANICAL MOTION SENSOR, AND A MICROMECHANICAL MOTION SENSOR

(75) Inventor: Anssi Blomqvist, Helsinki (FI)

(73) Assignee: VTI Technologies Oy, Vantaa (FI)

( * ) Notice: Subject to any disclaimer, the term of this patent is extended or adjusted under 35 U.S.C. 154(b) by 776 days.

(21) Appl. No.: 11/453,914

(22) Filed: Jun. 16, 2006

(65) Prior Publication Data

US 2007/0012108 A1    Jan. 18, 2007

(30) Foreign Application Priority Data

Jun. 17, 2005    (FI) .................................. 20055324

(51) Int. Cl.
*H01L 21/00* (2006.01)
(52) U.S. Cl. .............................. 438/68; 438/50; 438/64; 73/510
(58) Field of Classification Search ............ 73/510, 73/514.36; 29/595; 438/52, 48, 50, 66–68, 438/106, 107, 109, 110, 113; 257/690
See application file for complete search history.

(56) References Cited

U.S. PATENT DOCUMENTS

| | | | | |
|---|---|---|---|---|
| 4,758,824 A | * | 7/1988 | Young | 340/566 |
| 4,926,695 A | * | 5/1990 | Kleven et al. | 73/861.24 |
| 5,022,269 A | * | 6/1991 | Lew | 73/702 |
| 5,905,203 A | * | 5/1999 | Flach et al. | 73/514.32 |
| 7,081,657 B2 | * | 7/2006 | Faris | 257/415 |
| 2003/0176015 A1 | * | 9/2003 | Yoon et al. | 438/106 |
| 2003/0230143 A1 | * | 12/2003 | Mahon | 73/514.29 |

FOREIGN PATENT DOCUMENTS

| | | |
|---|---|---|
| GB | 2198231 | 6/1988 |
| JP | 6-331649 | 12/1994 |
| JP | 2002-286746 | 3/2001 |
| WO | WO 02/23630 | 3/2002 |
| WO | WO 03/107016 | 12/2003 |

\* cited by examiner

*Primary Examiner*—Hezron Williams
*Assistant Examiner*—Samir M Shah
(74) *Attorney, Agent, or Firm*—Squire, Sanders & Dempsey L.L.P.

(57) ABSTRACT

The present invention relates to measuring devices used in measuring physical quantities, such as acceleration, angular acceleration, or angular velocity, and, more precisely, to micromechanical motion sensors. The area, in the wafer plane, of a motion sensor component according to the present invention is smaller than the area of the motion sensor component having been dice cut and turned by 90°. Correspondingly, the height of the motion sensor component according to the present invention, the component having been turned by 90°, is smaller, in the direction of the joint, than the thickness of the wafer stack formed by the joined wafers. The object of the invention is to provide an improved method of manufacturing a micromechanical motion sensor, and to provide a micromechanical motion sensor suitable, in particular, for use in small micromechanical motion sensor solutions.

12 Claims, 6 Drawing Sheets

METHOD FOR MANUFACTURING A MICROMECHANICAL MOTION SENSOR, AND A MICROMECHANICAL MOTION SENSOR

FIELD OF THE INVENTION

The present invention relates to measuring devices used in the measuring of physical quantities, such as acceleration, angular acceleration, or angular velocity, and more precisely to micromechanical motion sensors. The object of the present invention is to provide an improved method for the manufacturing of a micromechanical motion sensor, and a micromechanical motion sensor applicable for use particularly in small micromechanical motion sensor solutions.

BACKGROUND OF THE INVENTION

Measuring based on a micromechanical motion sensor has proved to be a method of simple principle and a reliable one in measuring physical quantities, such as acceleration, angular velocity, or pressure. In a micromechanical motion sensor, the measuring is based on, for example, the capacitive principle, wherein a change in the motional state of the sensor causes a displacement of a spring suspended seismic mass. The position of the mass can be detected by means of the capacitance between a pair of electrodes, the capacitance between the surfaces being a function of their area and the distance between the surfaces. Measuring based on a micromechanical motion sensor can be used even at quite small metering ranges of various physical quantities.

Generally, small micromechanical motion sensors are based on micromechanical structures manufactured on silicon. The term bulk micromechanics denotes a thick micromechanical structure, typically thicker than 100 µm, formed by etching a wafer material. An advantage of bulk micromechanical sensors is the large mass of the structures in relation to the surface area, enabling the manufacturing of inertia sensors of excellent performance.

Connection and encapsulation methods of prior art presently in use in the manufacturing of professional and consumer electronics, and the miniaturization of consumer electronics have led to tight requirements regarding the size and, especially, the height of components, such as micromechanical motion sensors. Unfortunately, in bulk micromechanics, particularly the height of a sensor component in the direction perpendicular to the plane of the wafer is generally large and difficult to control, since, in hermetically sealing the wafer plane, the mechanical structure often has to be sealed on both sides. Thus, the sealing wafers significantly increase the height of the sensor component.

Below, prior art will be described with exemplifying reference to the accompanying drawings, of which:

FIG. 1 shows a wafer structure, according to prior art, used in the manufacturing of micromechanical motion sensors, FIG. 2 shows a component, according to prior art, diced out of a wafer structure used in the manufacturing of micromechanical motion sensors.

FIG. 1 shows a wafer structure, according to prior art, used in the manufacturing of micromechanical motion sensors. In the manufacturing, according to prior art, of micromechanical motion sensors, the micro systems formed on the central wafer 1 are sealed by attaching two hermetically sealing wafers 2, 3 on the top and bottom sides of the wafer, by, for example, anodic bonding.

FIG. 2 shows a component, according to prior art, diced out of a wafer structure used in the manufacturing of micromechanical motion sensors. The component, according to prior art, diced out of a wafer structure, typically comprises a moving electrode structure of the micromechanical motion sensor, formed on the central silicon wafer 4, which structure on both sides is sealed by means of two glass/silicon elements 5, 6 constituting the micromechanical motion sensor's static electrode structure. The height of the component, after dicing, is almost unavoidably large, since the thickness of the wafer stack 1-3 typically is 1.5-2.5 mm.

A problem in motion sensors, according to prior art, is the excessive height of the sensor component. The height of the sensor component can be reduced by making the sealing wafers thinner. There is, however, a limit to the thinning, and it is accompanied by new problems, such as an increased sensitivity to thermal stress, torsion or environmental disturbances.

In the manufacturing of professional and consumer electronics, there is an increasing demand for micromechanical motion sensors, which are lower than prior solutions and which are applicable for use in reliable measuring of various physical quantities, such as acceleration, angular acceleration, or pressure.

SUMMARY OF THE INVENTION

The object of the invention is an improved method for the manufacturing of a micromechanical motion sensor, and an improved micromechanical motion sensor. By means of this invention, savings in the height of circuit board components is achieved, and it is applicable for use, in particular, in small micromechanical motion sensor solutions.

According to a first characteristic of the invention, a method is provided for manufacturing a micromechanical sensor out of a wafer element, in which method a micromechanical motion sensor component is diced from a wafer stack obtained by joining at least two wafers, such that in the plane of the wafer surface, the area of a motion sensor component is smaller than the area of the motion sensor component diced and turned by 90°, and that in the direction of the joint, the height of the motion sensor component turned by 90° is smaller than the thickness of the wafer stack formed by the joined wafers.

Preferably, in the method, the electrical connection areas of the micromechanical motion sensor are deposited onto its dice cutting surface, the area of which is the largest.

Preferably, in the method:

the micromechanical motion sensor structures are etched on one wafer, at least two wafers are joined together forming a wafer stack, the wafer stack is diced by cutting motion sensor components, which, in the wafer plane, are narrow and long, the motion sensor components are turned onto one of their sides by 90° sides, and connection areas are metallized onto a dice cutting side of the motion sensor components.

Preferably, before joining the wafers, at least one of the wafers is covered with glass or oxide. Preferably, the number of wafers to be joined is three, one sealing wafer on each side of the wafer comprising the sensor structures.

According to a second characteristic of the invention, a micromechanical motion sensor diced from a wafer stack, obtained by joining at least two wafers, is provided, such that the area of the motion sensor component, in the plane of the wafer surface, is smaller than the area of the motion sensor component having been diced and turned by 90°, and that the height of the motion sensor component turned by 90° is smaller, in the direction of the joint, than the thickness of the wafer stack formed by the joined wafers.

Preferably, the electrical connection areas of the micromechanical motion sensor are deposited onto its dice cutting surface, the area of which is the largest.

Preferably, the seismic mass of the motion sensor is a long, beam-like structure supported at one edge on both sides. Alternatively, the seismic mass of the motion sensor is a long, beam-like structure supported at the center on both sides. Further, alternatively, the seismic masses of the motion sensor are structures positioned in various lateral directions in a plane, the structures being supported in one end at both edges. Further, alternatively, the seismic masses of the motion sensor are triangular structures positioned in various oblique directions in a plane, the structures being supported in one corner at both edges.

BRIEF DESCRIPTION OF THE DRAWINGS

Below, the invention and its preferable embodiments are described in detail with exemplifying reference to the attached figures, of which:

FIGS. 1-2 were presented above. Below, the present invention and its preferred embodiments are described with reference to the FIGS. 3 through 9.

DETAILED DESCRIPTION OF THE INVENTION

The micromechanical motion sensor solution according to the present invention is characterized in, that the motion sensor components are diced out of wafer structure, such that, in the plane of the wafer, the area of the diced component, is smaller than the area of the component diced and turned by 90°. The electrical connection areas of the micromechanical motion sensor according to the present invention are deposited onto its dice cutting surface, the area of which is the largest. In particular, the height, in the direction of the joint, of the micromechanical motion sensor component according to the present invention, the component having been turned by 90°, is smaller than the thickness of the wafer stack formed by the joined wafers.

Figure 1:
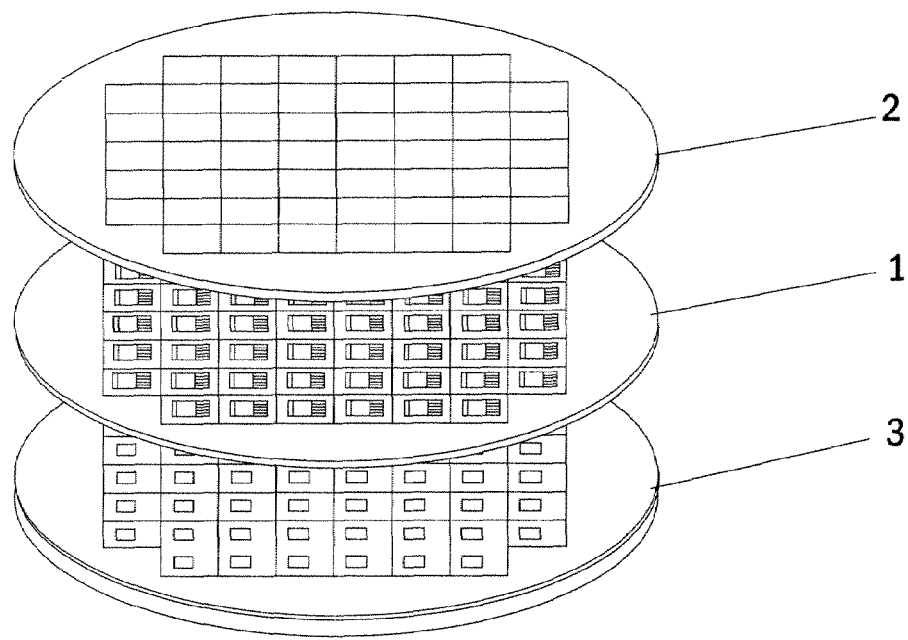
FIG. 1 shows a wafer structure, according to prior art, used in the manufacturing of micromechanical motion sensors.
Figure 2:
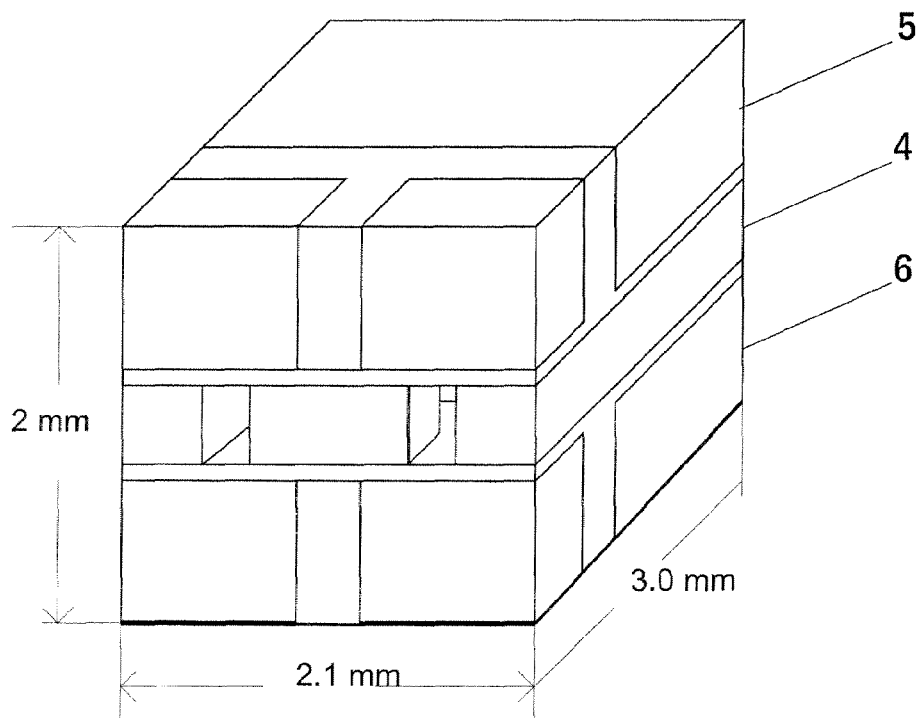
FIG. 2 shows a component, according to prior art, diced from a wafer structure used in the manufacturing of micromechanical motion sensors.
Figure 3:
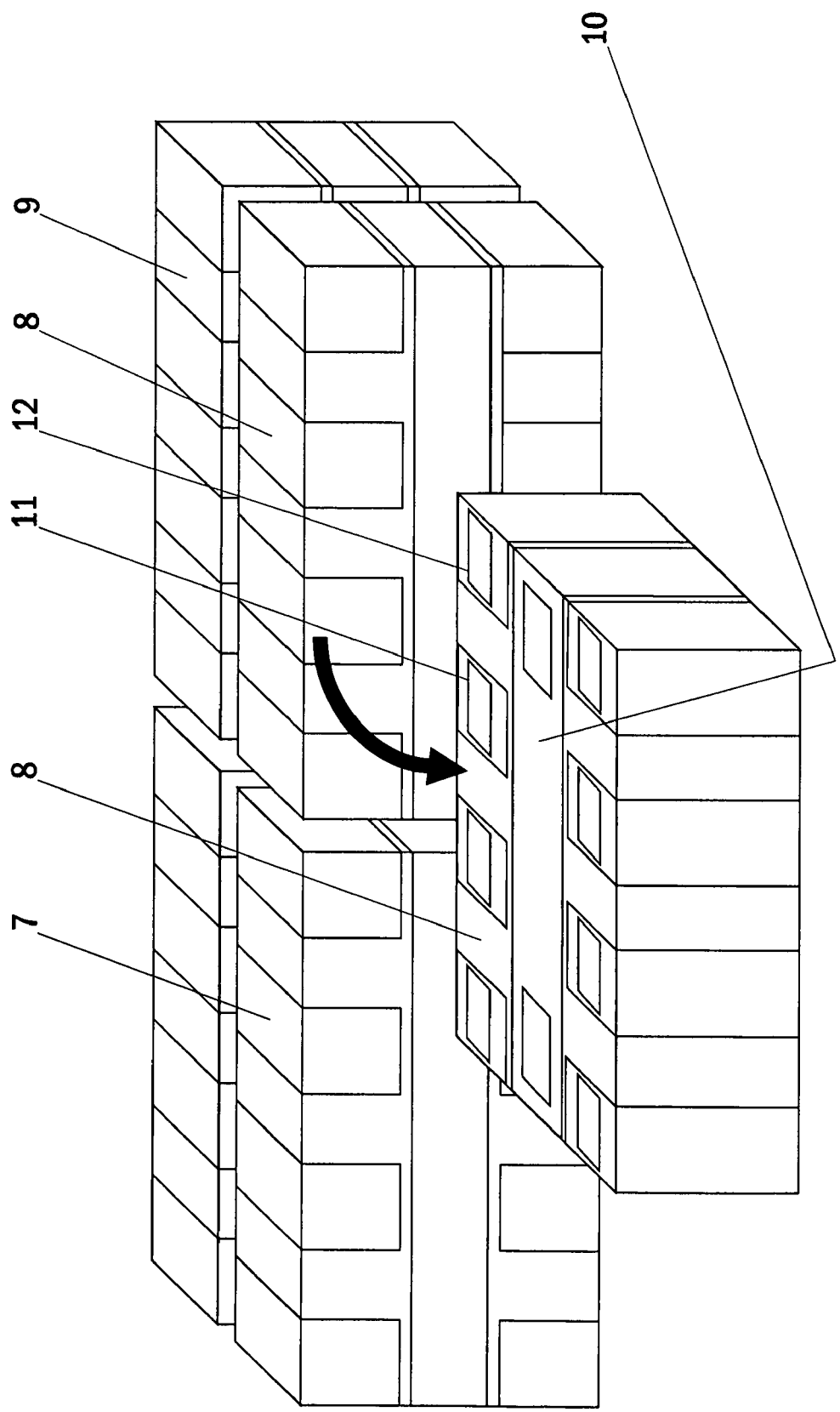
FIG. 3 shows a component, according to the present invention, diced out of a wafer structure used in the manufacturing of micromechanical motion sensors.

FIG. 3 shows a component, according to the present invention, diced out of a wafer structure used in the manufacturing of micromechanical motion sensors. The Figure shows several diced micromechanical motion sensor components 7-9, one micromechanical motion sensor component 8 of which is turned by 90° onto one of its sides. The component's connection areas 11, 12 are deposited onto a dice cutting side wall 10 of the diced micromechanical motion sensor component 8.

The structure of the micromechanical motion sensor according to the present invention is designed such, that a dimension, in the direction of the wafer surface, clearly smaller than the thickness of the wafer stack, even well below 1 mm, is obtained. In manufacturing the micromechanical motion sensors according to the present invention, extremely narrow and long components 7-9 are cut out of the wafer structure, contrary to the traditional technique.

In manufacturing micromechanical motion sensors according to the present invention, after joining and cutting the wafers, the connection areas of the component are deposited onto its dice cutting side, the area of which is the largest. After dicing, the components 7-9 are turned onto one side and the component's connection areas 11, 12 are deposited onto the other dice cutting side wall 10 of the components 7-9. By means of the solution according to the invention, the components become extremely low, when joined to a substrate or a capsule.

Figure 4:
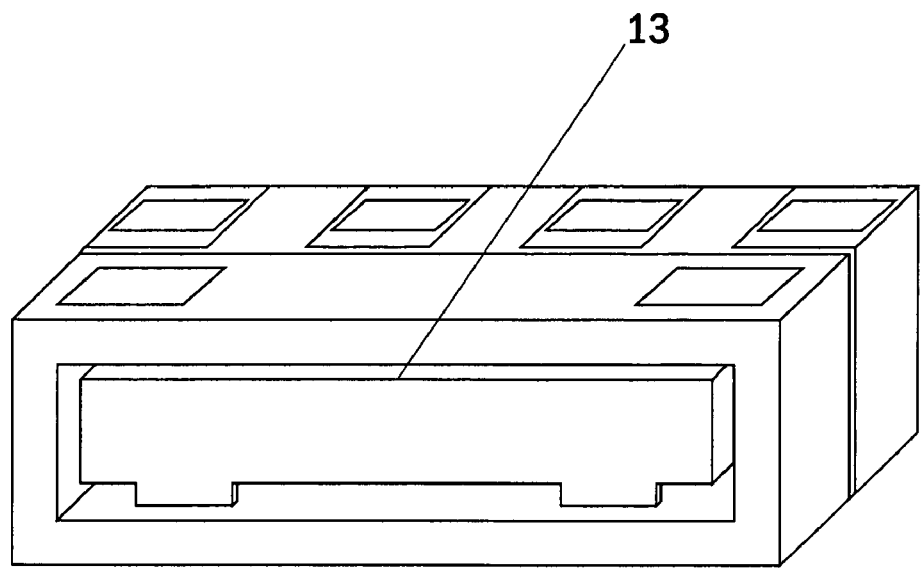
FIG. 4 shows a sectional view of a micromechanical motion sensor component, according to the present invention, diced out of a wafer structure.

FIG. 4 shows a sectional view of a micromechanical motion sensor component, according to the present invention, diced out of a wafer structure. In the micromechanical motion sensor according to the invention, the seismic mass 13 is a long, beam-like structure 13 supported at one edge and both sides of the mass by means of thin bending springs. Such a structure could serve as, for instance, a capacitive acceleration sensor.

In the micromechanical motion sensor according to the present invention, the dimensional proportions of the structure differ from those of typical micromechanics. Generally the micromechanical structures are wide in the wafer plane compared to the thickness of the wafer. In the solution according to the present invention, narrow slices are cut out of the wafer, which slices, when turned by 90°, are thin in the direction of joining and wide.

Figure 5:
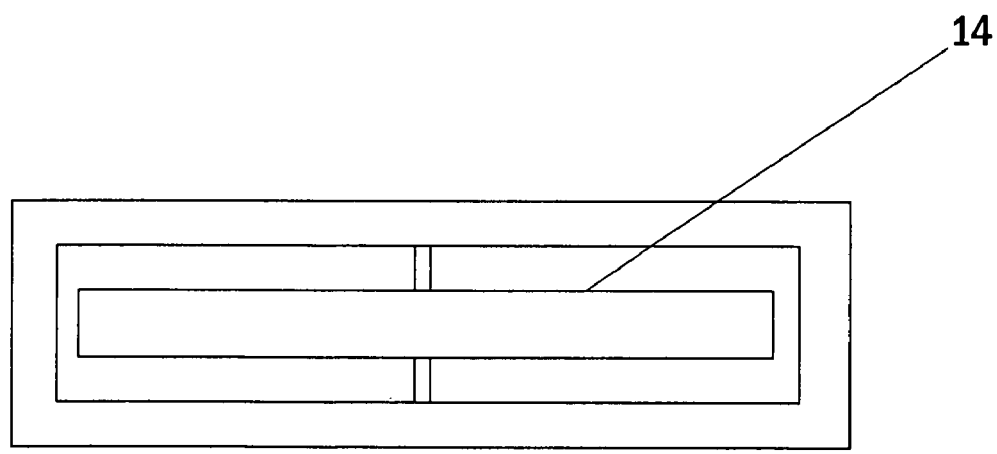
FIG. 5 shows an alternative structure solution, according to the present invention, of the seismic mass of a micromechanical motion sensor component.

FIG. 5 shows an alternative structure solution, according to the present invention, of the seismic mass of a micromechanical motion sensor component. In the alternative micromechanical motion sensor according to the present invention, the seismic mass 14 is a long, beam-like structure 14 supported at its center on both sides by means of thin or narrow torsion springs. Such a structure could serve as, for example, a capacitive sensor of angular acceleration.

Figure 6:
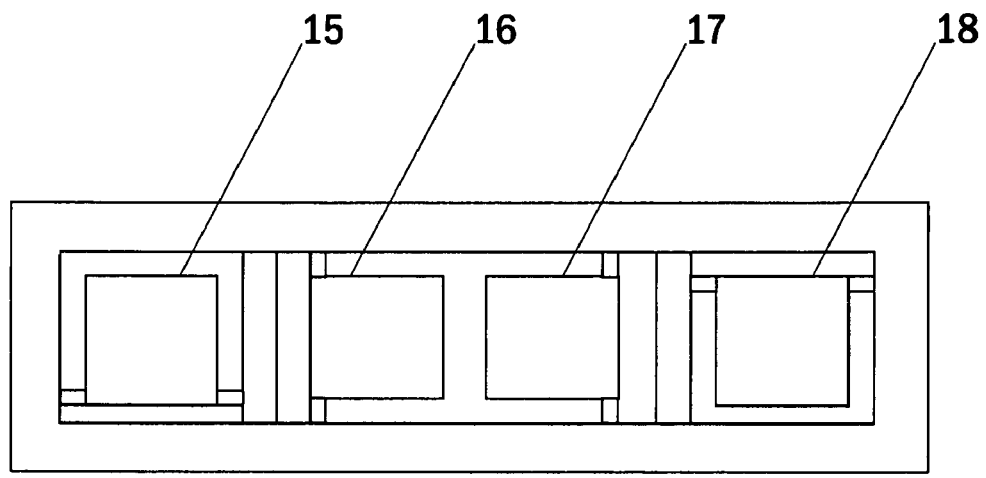
FIG. 6 shows a second alternative structure solution, according to the present invention, of the seismic masses of a micromechanical motion sensor component.

FIG. 6 shows a second alternative structure solution, according to the present invention, of the seismic masses of a micromechanical motion sensor component. In the second alternative micromechanical motion sensor according to the present invention, the seismic masses 15-18 are structures 15-18 installed in various lateral directions (0°, 90°, 180°, 270°) in a plane supported by means of thin or narrow torsion springs at one end on both edges. Such a structure could serve, for instance, as an acceleration sensor having several axes.

Figure 7:
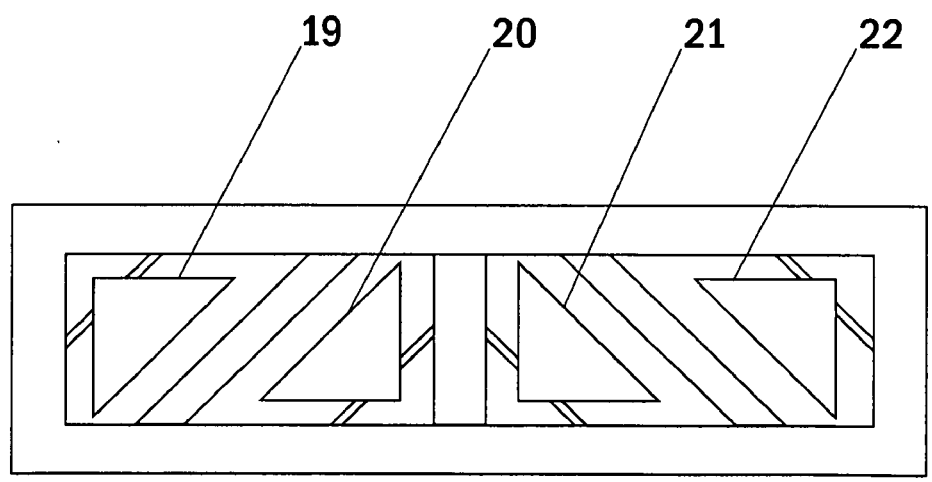
FIG. 7 shows a third alternative structure solution, according to the present invention, of the seismic masses of a micromechanical motion sensor component.

FIG. 7 shows a third alternative structure solution, according to the present invention, of the seismic masses of a micromechanical motion sensor component. In the third alternative micromechanical motion sensor according to the present invention, the seismic masses 19-22 are triangular structures 19-22 installed in various oblique directions (45°, 135°, 225°, 315°) in a plane, the structures being supported by means of thin or narrow torsion springs at one corner on both edges. Such a structure could serve as, for example, an acceleration sensor with several axes.

Figure 8:
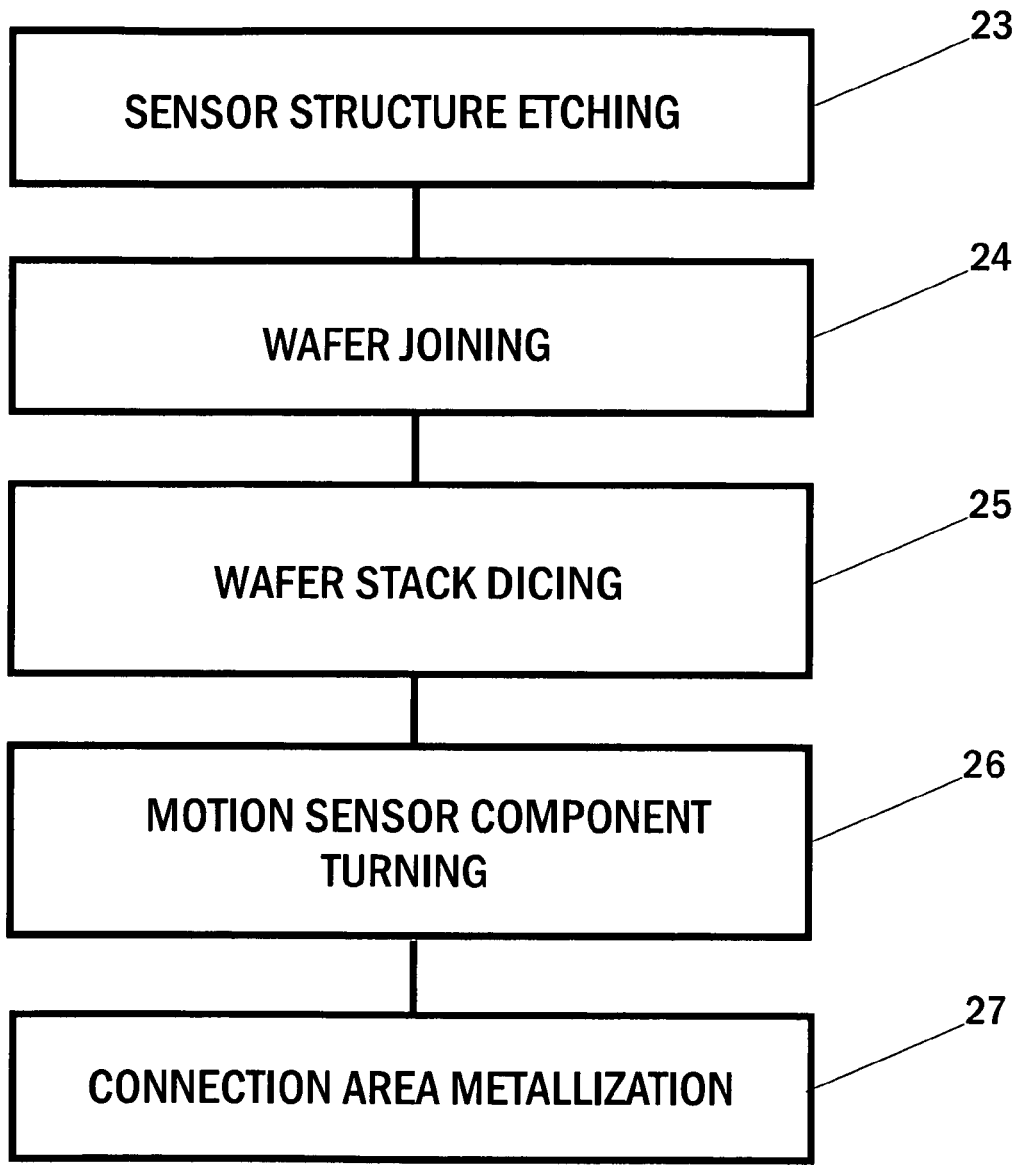
FIG. 8 shows a method, according to the present invention, of manufacturing a micromechanical motion sensor.

FIG. 8 shows a method, according to the present invention, of manufacturing a micromechanical motion sensor. In the method according to the present invention, at first, the sensor structures are etched 23 on at least one wafer. Next, at least two wafers are joined together 24 by, for example, anodic or fusion bonding. Typically, there can be three wafers to be joined, one sealing wafer on each side of the wafer comprising the sensor structures. The joined wafers constitute a wafer stack. After the joining, the wafer stack is diced 25 into narrow and long, in the wafer plane, motion sensor components. Next, the motion sensor components 26 are turned by 90° onto one side. Thereafter, connection areas are metallized 27 onto a dice cutting side of the motion sensor component.

Figure 9:
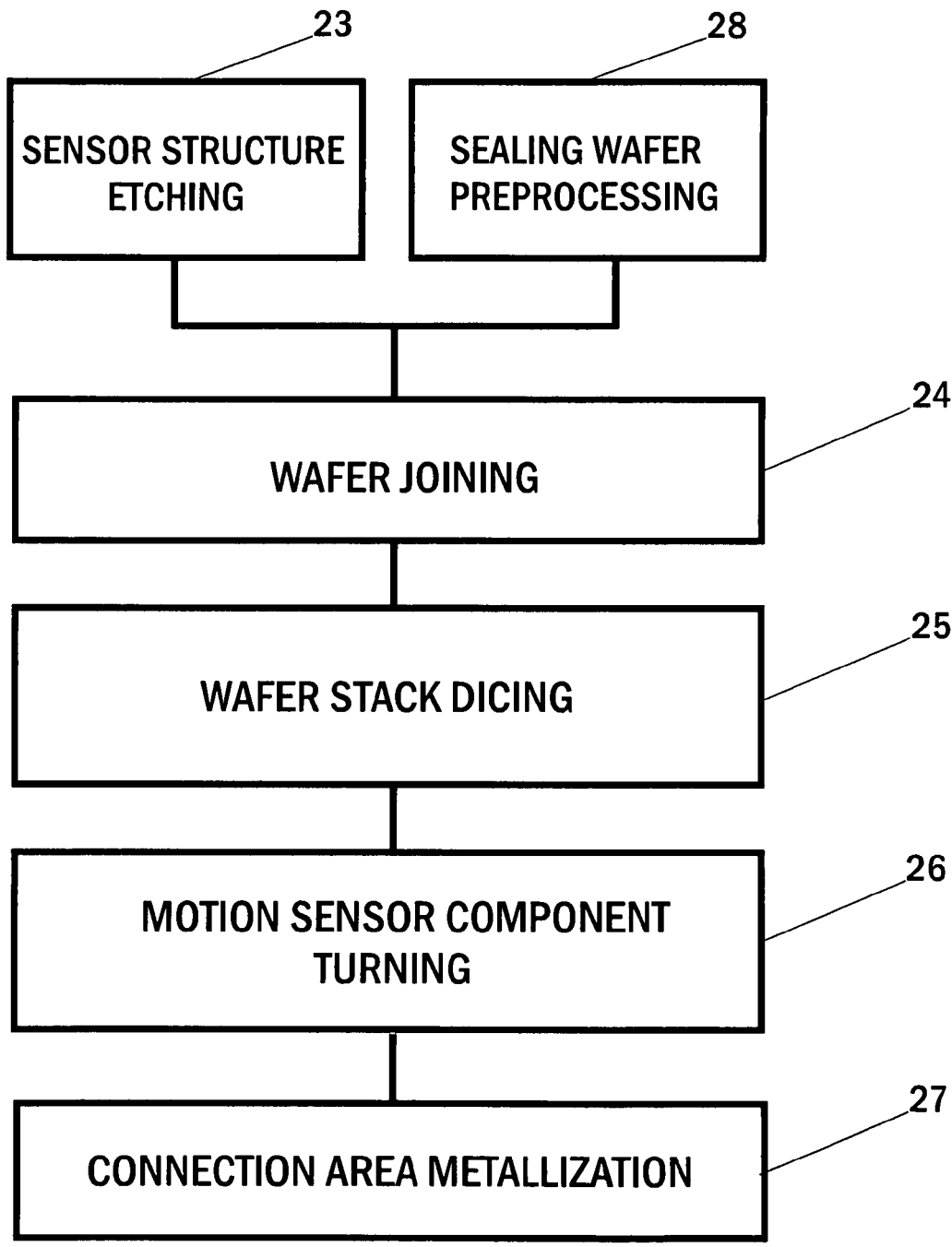
FIG. 9 shows an alternative method, according to the present invention, of manufacturing a micromechanical motion sensor.

FIG. 9 shows an alternative method, according to the present invention, of manufacturing a micromechanical motion sensor. In the alternative method according to the present invention, at least one of the sealing wafers is preprocessed by, for example, glazing or oxidizing 28. In addition, the sensor structures are etched 23 on at least one wafer. Next, at least two wafers are joined 24 to each other. There can, typically, be three wafers to be joined, one sealing wafer on each side of the wafer comprising the sensor structures. The joined wafers constitute a wafer stack. After the joining, the wafer stack is diced 25 into narrow and long, in the wafer plane, motion sensor components. Next, the motion sensor components 26 are turned by 90° onto one side. Then, connection areas are metallized 27 onto a dice cutting side of the motion sensor component.

In a micromechanical motion sensor manufactured by means of the method according to the present invention, the thickness of the wafers will not limit the height of an encapsulated component provided with contact areas. The height is solely determined by the design of the exposure masks, the dimensioning of which, according to the requirements of component packaging and attachment as well as performance, is much easier.

Thus, the micromechanical motion sensor solution according to the present invention enables the maximization of the performance of an extremely low micromechanical sensor, since the wafers sealing the component do not increase its height. By means of the solution according to the present invention, almost all of the wafer plane area of the component can be utilized as a motion sensor mass. On the edges of the motion sensor according to the present invention, only a frame area, needed for joining and hermetical sealing of the wafers, is required, the width of which area being typically about 100-200 µm.

The invention claimed is:

1. A method, comprising:
    dicing a micromechanical motion sensor component out of a wafer stack obtained by joining at least two wafers to each other,
    wherein the micromechanical motion sensor component is diced such, that
        in a wafer surface plane, an area of the micromechanical motion sensor component is smaller than an area of the motion sensor component having been dice cut and turned by 90°, and that
        in a direction of a joint, a height of the motion sensor component having been turned by 90° is smaller than a thickness of the wafer stack formed by the joining of the at least two wafers;
    etching micromechanical motion sensor structures on one wafer;
    joining the at least two wafers together to form the wafer stack;
    dicing, in the wafer plane, the wafer stack into narrow and long motion sensor components;
    turning the motion sensor components by 90 degrees onto one side; and
    metallizing connection areas onto a dice cut side of the motion sensor components.

2. The method according to claim 1, further comprising:
    depositing electrical connection areas on a largest dice cut surface of the micromechanical motion sensor.

3. The method according to claim 1, further comprising:
    glazing or oxidizing at least one of the wafers prior to the joining of the wafers.

4. The method according to claim 1, wherein there three wafers are joined, one sealing wafer on both sides of the wafer comprising the micromechanical motion sensor structures.

5. A micromechanical motion sensor, comprising:
    a motion sensor component in a wafer surface plane, the motion sensor component having an area that is smaller than an area of the motion sensor component dice cut and turned by 90°, and a height, in the direction of a joint and turned by 90°, that is smaller than a thickness of a wafer stack formed by joining at least two wafers, wherein seismic masses of the motion sensor are structures installed in a plane in various lateral directions supported at one end at both edges.

6. The motion sensor according to claim 5, further comprising:
    electrical connection areas located on a largest dice cut surface.

7. The motion sensor according to claim 5, wherein at least one of the seismic masses of the motion sensor is a long, beam-like structure supported at one side wall on both sides.

8. The motion sensor according to claim 5, wherein at least one of the seismic masses of the motion sensor is a long, beam-like structure supported at a center at both side walls.

9. The motion sensor according to claim 5, wherein the seismic masses of the motion sensor are structures installed in the plane in various lateral directions supported by thin or narrow torsion springs at one end at both edges.

10. A micromechanical motion sensor, comprising:
    a motion sensor component in a wafer surface plane, the motion sensor component having an area that is smaller than an area of the motion sensor component dice cut and turned by 90°, and a height, in the direction of a joint and turned by 90°, that is smaller than a thickness of a wafer stack formed by joining at least two wafers, wherein seismic masses of the motion sensor are triangular structures installed in a plane in various oblique directions supported at one corner at both edges.

11. The motion sensor according to claim 10, wherein the seismic masses of the motion sensor are triangular structures installed in the plane in various oblique directions supported by thin or narrow torsion springs at one corner at both edges.

12. The motion sensor according to claim 10, further comprising:
    electrical connection areas located on a largest dice cut surface.

* * * * *